United States Patent
Johnston et al.

(10) Patent No.: US 7,190,797 B1
(45) Date of Patent: Mar. 13, 2007

(54) HEADSET WITH FOLDABLE NOISE CANCELING AND OMNIDIRECTIONAL DUAL-MODE BOOM

(75) Inventors: Tim Johnston, Los Gatos, CA (US); Kwangsee Allen Woo, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 519 days.

(21) Appl. No.: 10/174,285

(22) Filed: Jun. 18, 2002

(51) Int. Cl.
    *G05B 21/02* (2006.01)
(52) U.S. Cl. .......................................... 381/74; 379/430
(58) Field of Classification Search ................ 381/74, 381/350–364, 313, 375, 370, 91–92, 122, 381/150, 385; 181/120; 379/430, 433.13, 379/428.01, 433.01–433.03; 180/20
    See application file for complete search history.

(56) References Cited

U.S. PATENT DOCUMENTS

| | | | | |
|---|---|---|---|---|
| 3,946,168 A | * | 3/1976 | Preves | 381/313 |
| 4,420,657 A | * | 12/1983 | Larkin | 379/430 |
| 5,504,813 A | * | 4/1996 | Takasaki | 379/433.13 |
| 5,715,321 A | * | 2/1998 | Andrea et al. | 381/92 |
| 6,016,347 A | * | 1/2000 | Magnasco et al. | 379/430 |
| 6,490,362 B1 | * | 12/2002 | Clegg et al. | 381/375 |
| 6,644,614 B1 | * | 11/2003 | Chen | 248/316.1 |
| 6,768,804 B1 | * | 7/2004 | Isvan | 381/376 |
| 6,819,762 B2 | * | 11/2004 | Jones et al. | 379/430 |
| 2002/0194005 A1 | * | 12/2002 | Lahr | 704/271 |
| 2004/0052364 A1 | * | 3/2004 | Bodley et al. | 379/430 |

* cited by examiner

*Primary Examiner*—Vivian Chin
*Assistant Examiner*—Lun-See Lao
(74) *Attorney, Agent, or Firm*—Jung-hua Kuo

(57) ABSTRACT

A telephone headset utilizing a foldable microphone boom that is operable in both noise canceling and omnidirectional modes is disclosed. The headset generally comprises a main body, a boom extending between a pivoting end and a microphone housing for housing a two-port microphone, and a pivoting hinge coupling the pivoting end of the boom to the main body and enabling the boom to rotate about the pivoting hinge relative to the main body. The boom is adapted to be positioned in a first extended position in which the microphone is located away from the main body and both ports are open and a second folded position in which the microphone housing is at least partially in contact with the main body to generally close one of the ports.

29 Claims, 9 Drawing Sheets

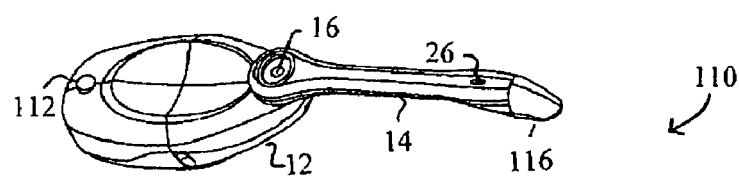
FIG. 9A
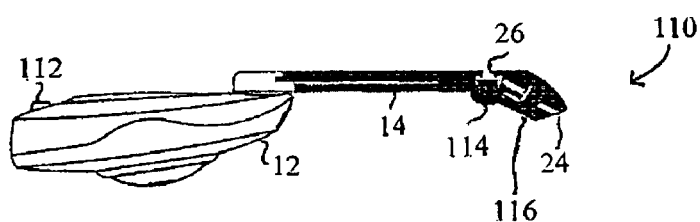
FIG. 9B
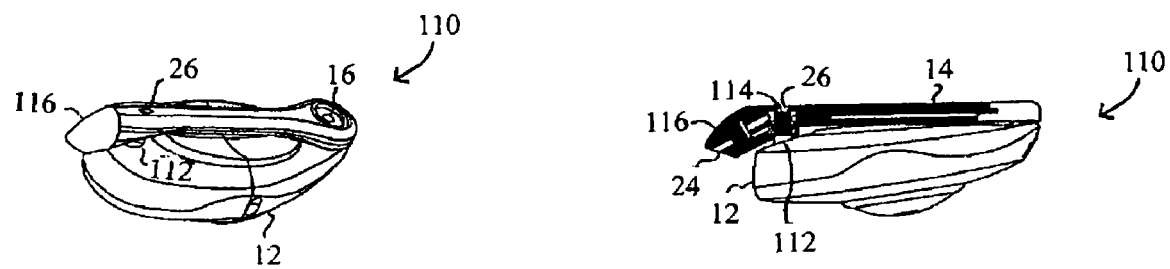
FIG. 9C       FIG. 9D

HEADSET WITH FOLDABLE NOISE CANCELING AND OMNIDIRECTIONAL DUAL-MODE BOOM

BACKGROUND OF THE INVENTION

1. Field of the Invention

The present invention relates generally to a telephone headset utilizing a microphone boom. More specifically, a telephone headset utilizing a foldable microphone boom that is operable in both noise canceling and omnidirectional modes is disclosed.

2. Description of Related Art

With increasing usage of mobile communications devices such as cellular telephones as well as increasing reliance upon telephones as a preferred mode of communication, both in business and personal settings, telephone headsets are gaining popularity in a variety of applications. Some commercially available headsets have long booms that place the acoustic sensing point near the user's mouth while others have short booms or no booms at all. The term "acoustic sensing point" is used herein to refer to the location or point in space where a headset collects sound waves.

In some headsets, the microphone is located directly at the acoustic sensing point at the distal end of a boom. One example of such a microphone is a noise canceling microphone. A noise canceling microphone is generally direction sensitive, i.e., it is more sensitive to incoming acoustic signal in certain directions and less sensitive in other directions. When used in a noisy environment, the noise canceling microphone can increase the user's voice signal-to-ambient noise ratio. The noise canceling microphone is typically placed at the end of a long boom such that when the microphone is positioned to aim at the user's mouth, the user's voice approaches the microphone in or near the direction of maximum sensitivity for the microphone. The ambient noise, on the other hand, is usually diffused and approaches the microphone from many different directions. Thus, only a small portion of the ambient noise approaches the microphone in the directions of high sensitivity. Even if the noise source is non-diffused such as where the noise originates from one or a few specific directions, there is a high probability that a large portion of the noise approaches from directions in which the microphone is relatively insensitive.

In addition, noise canceling microphones have higher near field to far field sensitivity ratio, known as "proximity effect," than omni-directional microphones. The proximity effect results from the acoustic pressure gradient between the arrival of the sound waves to the front and to the rear of the noise canceling microphone's diaphragm. The proximity effect causes noise canceling microphones to have higher user's voice signal-to-ambient noise ratios than omni-directional microphones.

The advantages of a noise canceling microphone can be realized generally only if the acoustic sensing point is close to the user's mouth and appropriately positioned. In order to satisfy these conditions, a sufficiently long boom is generally required that provides the user with enough flexibility to position the microphone close to and aim the microphone towards the user's mouth. The superior performance of a noise canceling microphone depends on the proximity effect and on the assumption that the noise is diffuse or that it approaches from an angle outside the maximum sensitivity range of angles associated with the microphone, which is not always valid. Moreover, noise canceling microphone is known to be more susceptible to wind noise than omnidirectional microphone.

A long boom, which places the acoustic sensing point near the user's mouth, as required for effective noise canceling, is not always desirable for users. A headset with a short boom or no boom at all is typically more appealing because of its unobtrusive and stylish appearance and easy stowability. This is particularly true for users of portable communication applications such as mobile phones.

When a short boom or boomless headset is used, the distance between the user's mouth and the acoustic sensing point of the headset is relatively large and an omni-directional microphone is typically used. An omni-directional microphone has a sound port on one side of the microphone diaphragm, in contrast to both sides of the microphone diaphragm in the case of a noise canceling microphone. When used in noisy environments, a headset with an omnidirectional microphone generally provides a lower than desirable user's voice signal-to-ambient noise ratio. However, because of the unobtrusive and stylish appearance and easy stowability of compact short boom or boomless headset, users continue to demand this type of headsets in many applications.

However, when a headset is used in conjunction with a mobile communications device such as cellular telephone, the headset is generally required to provide consistently high transmit signal quality especially in noisy environments. For example, it would be advantageous to reduce the obscuring effect of ambient noise in the transmit signals when the headset is used outdoors.

A headset with a foldable boom is available as a compromise between the desire for compactness and style and the need for satisfactory transmit signal quality. Typically, such a headset with a foldable boom have an inoperable compact mode in which the boom is folded on top of the body for storage and an extended-boom mode in which the headset is operable with adequate transmit signal quality. When the boom is folded on top of the body to place the headset in the compact mode for storage, the acoustic sensing point typically ends up behind the user's ear where it is generally too far from the user's mouth to assure a sufficient transmit signal level and signal-to-noise ratio at normal speech levels. Because the headset is inoperable when the headset is in the compact mode, the user is still required to extend the boom in this conventional headset with foldable boom in order to utilize the headset.

Thus, what is needed is a headset that provides both the unobtrusive and stylish appearance and easy stowability of a compact short boom utilizing an omnidirectional microphone for application in a less noisy environment and satisfactory transmit signal quality of a longer boom utilizing a noise canceling microphone for application in a noisy environments. Preferably, the headset has multiple modes of operation, including a noise canceling mode and a compact mode for when noise is not an issue.

SUMMARY OF THE INVENTION

A telephone headset utilizing a foldable microphone boom that is operable in both noise canceling and omnidirectional modes is disclosed. It should be appreciated that the present invention can be implemented in numerous ways, including as a process, an apparatus, a system, a device, or a method. Several inventive embodiments of the present invention are described below.

The headset generally comprises a main body, a boom extending between a pivoting end and a microphone housing for housing a two-port microphone, and a pivoting hinge coupling the pivoting end of the boom to the main body and enabling the boom to rotate about the pivoting hinge relative to the main body. The boom is adapted to be positioned in a first extended position in which the microphone is located away from the main body and both ports are open and a second folded position in which the microphone housing is at least partially in contact with the main body to generally close one of the ports.

The headset is operable in a noise canceling mode of operation when the boom is in the first extended position and in an omnidirectional mode of operation when the boom is in the second folded position. In the second folded position, one of the ports is generally closed from receiving acoustic signals by the main body. The microphone housing and/or the contact location preferably comprises an elastomeric material. The ports comprises a front port and a rear port that is further away from the desired acoustic source than the front port when the boom is in the first extended position. The microphone typically includes a diaphragm and the front and rear ports are disposed on opposing sides of the diaphragm.

Various mechanisms may be employed in order for the main body to contact the microphone housing in order to close the desired port on the boom when the boom is in the second folded position. For example, the main body may comprise a clip configured to receive the microphone housing when the boom is in the second folded position. The clip includes a projection extending therefrom adapted to generally close one of the ports. Alternatively, the main body may comprise a pin configured for at least partial insertion into and generally closing of one of the ports. As another example, the main body may include a lug and the microphone housing may define a cavity into which one of the ports terminates, the lug being configured to be at least partially positioned in the cavity for closing the port that terminates in the cavity.

As yet another example, the main body may comprise a wall extension and the microphone housing may comprise a flexible member forming a boundary for one of the ports, where the wall extension is configured to push against the flexible member to cause the flexible member to generally close the port for which the flexible member is a boundary. Alternatively, the main body includes a tab and wherein the microphone housing defines a cavity and includes a flexible member forming a boundary for one of the ports as well as for the cavity, the tab being configured to be at least partially inserted into the cavity to push against the flexible member to thereby cause the flexible member to generally close the port for which the flexible member is a boundary.

As yet another example, the main body may include a ramp that defines a detent configured to receive the microphone housing therein and the detent has a projection extending therefrom configured for at least partial insertion into and generally closing of one of the ports. Alternatively, the main body may define a receiving cavity configured to receive the microphone housing therein and comprises a projection configured for at least partial insertion into and generally closing of one of the ports. In this configuration, the boom is generally curved to facilitate seating of the microphone housing in the receiving cavity when the boom is in the second position.

As is evident, these are merely examples of various implementations and numerous other variations may also be employed. These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 9A and 9B are a perspective and a side view, respectively, of yet another exemplary foldable boom, dual-mode headset operable in both noise canceling and omnidirectional modes and with the boom unfolded in the noise canceling mode; and FIGS. 9C and 9D are a perspective and a side view, respectively, of the headset of FIGS. 9A and 9B with the boom folded for operation in the omnidirectional mode.

DESCRIPTION OF SPECIFIC EMBODIMENTS

Figure 1A:
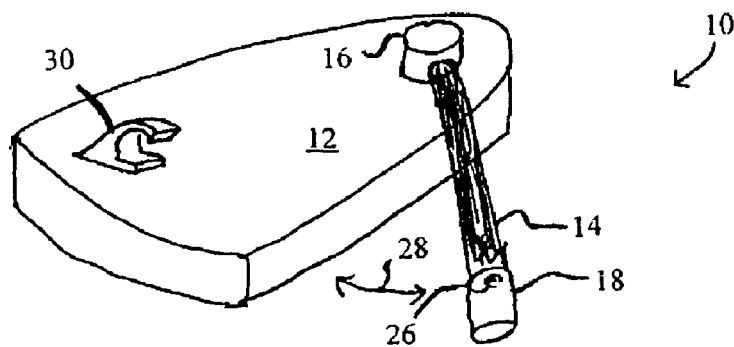
FIG. 1A is a perspective view of an exemplary foldable boom, dual-mode telephone headset operable in both noise canceling and omnidirectional modes.

A telephone headset utilizing a foldable microphone boom that is operable in both noise canceling and omnidirectional modes is disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

FIGS. 1–9 illustrate various exemplary embodiments of a dual-mode telephone headset utilizing a foldable microphone boom that is operable in both noise canceling and omnidirectional modes. A general introduction of the noise canceling and omnidirectional microphones and modes of operation will now be presented and will serve as basis for subsequent detailed discussion of the various embodiment of the dual-mode telephone headset as illustrated in FIGS. 1–9.

Noise Canceling and Omnidirectional Microphones and Modes of Operation

In contrast to a conventional headset that contains either a noise canceling microphone or an omnidirectional microphone that operates only in the noise canceling or the omnidirectional mode, respectively, the dual-mode headset is selectively operable in either of the two modes. Headsets with noise canceling microphones generally have relatively long booms in order to place or position the microphones within the booms close to acoustic source, i.e., the user's mouth. Noise canceling allows the user to transmit the user's voice in noisy environments by having most ambient noise eliminated so that the user's voice is better received on the receiving end of the transmission. Noise canceling microphones typically have two ports and require that the microphone be positioned relatively precisely at the edge of the user's mouth and aligned such that the two ports are generally axial to the desired acoustic source, i.e., one port is aimed at the mouth and the other away from the mouth, shadowed by the microphone housing or the end of the boom.

One type of a noise canceling microphone is a pressure gradient microphone that has an internal diaphragm that moves when subjected on its two opposing surfaces to different sound pressures, i.e., gradient sound pressures and the sound wave's phase shift. For a near field sound source, e.g. the user's voice, the sensitivity of the microphone is mainly due to the sound pressure gradient. For a far field sound source, e.g. ambient noise, the sensitivity is mainly due to the sound waves phase shift. When the microphone is not properly positioned or is too far away from the user's mouth, the pressure gradient effects decreases. In some cases, e.g., when the microphone is placed further away from the user's mouth, the sensitivity of the noise canceling microphone becomes insufficiently low.

In contrast, the non-noise canceling or omnidirectional microphones generally do not require as specific a location with respect to the mouth as the noise canceling microphone because the omnidirectional microphones contain only one port. As such, the omnidirectional microphone is very forgiving as to the position of the microphone, thereby allowing for shorter booms and a more grossly misaligned position. Thus, headsets with omnidirectional microphones can have relatively short booms for a discreet, sleek, less obtrusive, and stylish design for use in less noisy environments.

Various Embodiments of Dual-Mode Headset Utilizing Foldable Microphone Boom

An overview of noise canceling and omnidirectional microphones and modes of operation having been presented, the various exemplary embodiments of the dual-mode telephone headset utilizing a foldable microphone boom that is operable in both noise canceling and omnidirectional modes will now be described in more detail with reference to FIGS. 1–9.

Figure 1B:
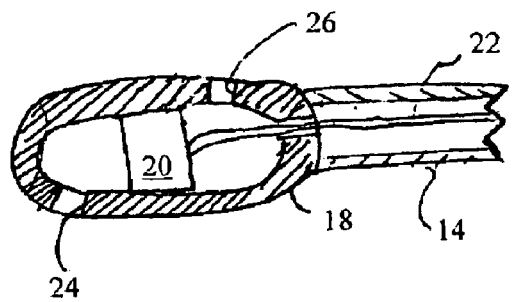
FIG. 1B is a partial cross-sectional view of the foldable boom of the headset shown in FIG. 1A illustrating a microphone housing and a microphone.

In particular, FIG. 1A is a perspective view of the dual-mode headset 10. The dual-mode headset 10 is operable in both a noise canceling mode and an omnidirectional mode. As shown, the dual-mode headset 10 comprises a headset main body 12, a foldable boom 14 having a pivoting hinge 16 at one end about which the foldable boom 14 may rotate or pivot and a microphone housing 18 at the opposite end for containing a microphone. FIG. 1B is a partial cross-sectional view of the foldable boom 14 of the headset 10 illustrating the microphone housing 18, the microphone 20 and microphone wires 22. It will be readily apparent to those skilled in the art that any suitable pivoting mechanism such as a cylindrical pin-and-tube pivoting mechanism may be employed for the pivoting hinge 16. Preferably the pivoting hinge 16 is such that it is relatively easy for a user to reposition the boom 14 by rotating the boom 14 about the pivoting hinge 16. On the other hand, preferably the pivoting hinge 16 is also such that it holds the boom 14 in the position to which the boom 14 was moved by the user. In other words, the pivoting hinge 16 provides a level of resistance that allows the user to easily reposition the boom 14 and that maintains the boom 14 at the location to which the boom was moved over time.

As shown in FIG. 1B, the microphone housing 18 provides a front microphone port 24 and a rear microphone port 26. The front port 24 refers to the port closest to the user's mouth when the foldable boom 14 is in the extended or unfolded position as shown in FIG. 1A. The rear port 26 refers to the port further away from the user's mouth, shadowed by the microphone housing 18 and/or the end of the boom 14.

The foldable boom 14 can be extended or folded by rotating the boom 14 about the pivoting hinge 16 in a direction shown by arrow 28 (FIG. 1A). When the foldable boom 14 is in an extended position, the headset 10 is operable in the noise canceling mode.

Figure 1C:
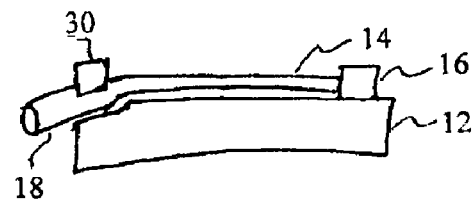
FIG. 1C is a side view of the headset of FIG. 1A with the boom folded for operation in the omnidirectional mode.

Alternatively, as shown in the side view of FIG. 1C, when the headset 10 is in a folded or stowed position, i.e., when the microphone housing 18 is secured to the headset main body 12 via a microphone securing mechanism such as clip, catch, or clasp 30, the headset 10 is operable in the omnidirectional mode. In particular, when the foldable boom 14 is in the folded position, i.e., in the omnidirectional mode, the clip 30 operates to close off one of the two ports 24, 26 provided by the microphone housing 18. The clip 30 is generally configured or shaped to receive the microphone housing 18 of the foldable boom 14. For example, as shown, the clip 30 defines a cross sectional shape generally corresponding to the shape of the microphone housing 18, i.e., rounded or circular. In the present example, the clip 30 generally has a "C" cross-sectional shape.

Although not shown, the headset main body 12 preferably provides an ear piece generally opposite the clip 30. For example, the ear piece may have a generally pill-shaped configuration with a foam covering. The ear piece is preferably designed both as a mounting device that enables a user to wear the headset 10 and as an encasement for an receiver element (not shown). The headset may be an intra-concha headset in which the ear piece is configured to be positioned inside the concha, i.e., the cavity surrounding the opening to the ear canal, a supraaural headset in which the ear piece is configured to rest against the pinna, or a circumaural headset in which the ear piece is configured to surround the pinna. It will be readily apparent to one skilled in the art that any suitable alternative configurations and sizes of ear piece may be provided with the headset 10.

Figure 1D:
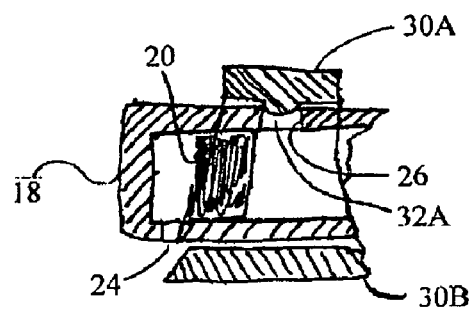
FIGS. 1D and 1E are partial cross-sectional views of two alternate configurations of the headset of FIG. 1A with the boom folded for operation in the omnidirectional mode.
Figure 1E:
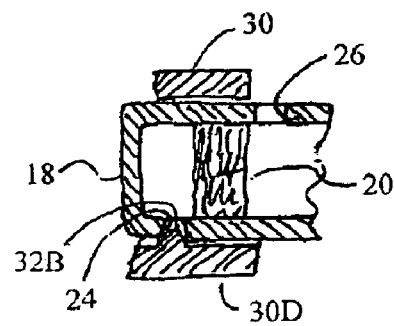

FIGS. 1D and 1E are partial cross-sectional views that illustrate two alternative configurations of the clip 30. In the embodiment shown in FIG. 1D, the upper clip portion 30A defines a projection or protrusion 32A configured to rest in and close off the rear port 26 while the lower clip portion 30B extends short of the front port 24 in order to leave the front port 24 unobstructed and open. In the embodiment shown in FIG. 1E, the lower clip portion 30D defines a projection or protrusion 32B configured to rest in and close off the front port 24 while the upper clip portion 30C extends short of the rear port 26 in order to leave the rear port 26 unobstructed and open.

It is noted that the closing of the front or rear port 24, 26 need to be closed to sufficiently tight in order to block sound pressure from reaching the diaphragm (not shown) of the microphone 20. In other words, in the folded position, the microphone only senses sound pressure from the open port and thus becomes omnidirectional with higher sensitivity than the two port noise canceling mode. This added sensitivity facilitates the functioning of the headset in the folded position as the microphone is located further away from the user's mouth and experiences less sound pressure.

In addition, the opening defined by the clip 30 is generally slightly smaller than the microphone housing 18 such that a small amount of pressure or force is needed to position the microphone housing 18 of the foldable boom 14 into the clip 30, i.e., from a noise canceling mode to an omnidirectional mode, and vice versa. Further, the clip 30 preferably comprises an elastomeric material to allow some deformation of the clip 30 to enable the microphone housing 18 to pass through the undersized opening of the clip 30. The microphone housing 18 itself may also be formed of an elastomeric material to further facilitate the act of securing and unsecuring the boom 14 into and out of the clip 30. As yet another alternative, the projection of the clip may comprise an elastomeric material such as rubber. It is also desirable for the clip 30 to provide some tactile and/or audible feedback, such as with a slight clicking tactile feel and/or sound, to confirm to the user that the microphone housing 18 is secured within the clip 30.

As is evident, the dual-mode headset 10 provides the user with the option of operating in the single port, omnidirectional mode when the foldable boom 14 is in a stored or folded position or in a two port, noise canceling mode when the foldable boom 14 is rotated in a direction shown by arrow 28 about the pivoting hinge 16 to the extended position and the microphone 20 is positioned near the user's mouth. In addition, when in the folded position, the dual-mode headset 10 is also compact for increased easy of storage and portability.

Figure 2A:
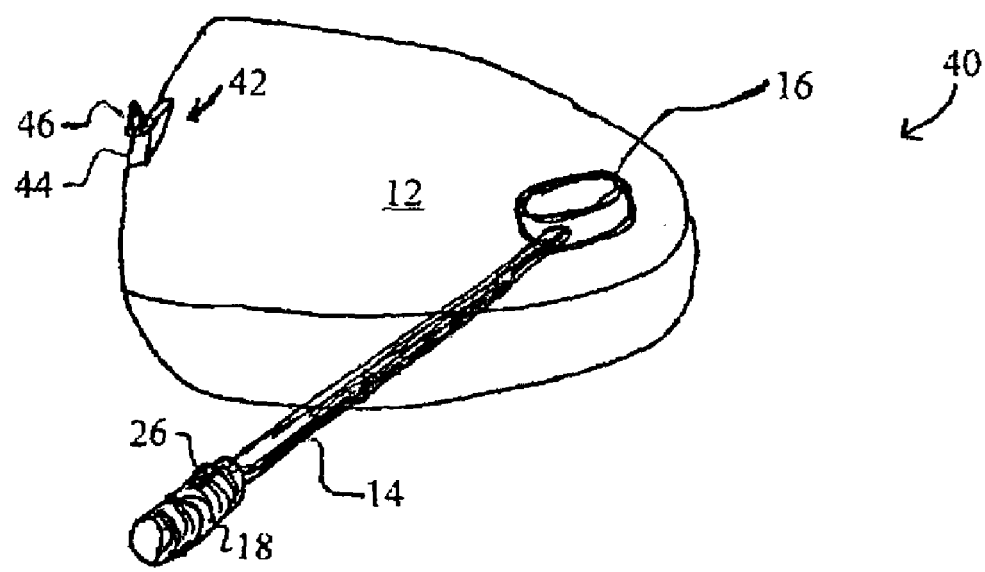
FIG. 2A is a perspective view of another exemplary foldable boom, dual-mode headset operable in both noise canceling and omnidirectional modes.

FIG. 2A is a perspective view of another exemplary foldable boom, dual-mode headset 40 operable in both noise canceling and omnidirectional modes and shown in the noise canceling mode position. It is noted that like reference numerals are used herein for like components or elements of the various alternative embodiments of the headset as for the headset 10 shown and described above with reference to FIGS. 1A–1E and are not discussed again in detail solely for purposes of clarity.

Figure 2B:
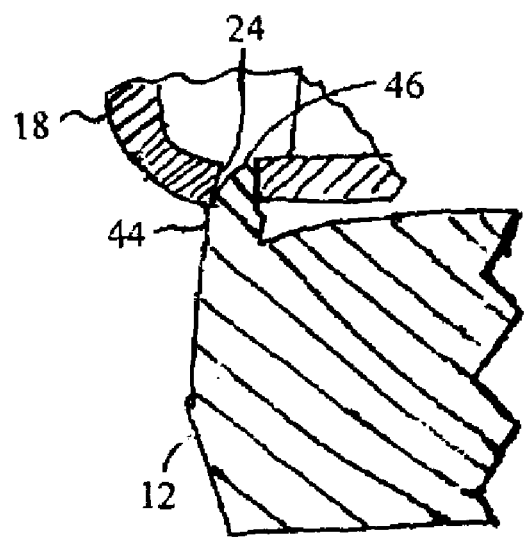
FIG. 2B is a partial cross-sectional view of the headset of FIG. 2A with the boom folded for operation in the omnidirectional mode.

Rather than employing a clip as a microphone securing mechanism, the microphone securing mechanism 42 for the headset 40 comprises a pin base 44 and a pin body 46 that operates to secure the foldable boom 14 to the headset main body 12 in the folded position. In addition, as shown in FIG. 2B, when the foldable boom 14 is in the folded position, i.e., in the omnidirectional mode, the pin body 46 at least partially rests in and closes off the front port 24 while leaving the rear port 26 unobstructed and open for sensing sound pressures.

The pin base 44 of the microphone securing mechanism 42 is preferably sloped on either side of the pin body 46 to facilitate positioning of the front port 24 of the microphone housing 18 over the pin body 46. In addition, preferably at least the pin body 46 is comprised of an elastomeric material such as rubber to allow some bending of the pin body 46 to further facilitate positioning of the front port 24 of the microphone housing 18 over the pin body 46. The microphone securing mechanism 42 optionally provides tactile and/or audible feedback, such as a tactile or audible click, to confirm to the user that the microphone housing 18 is secured to the microphone securing mechanism 42.

Furthermore, the microphone housing 18 may be passively maintained against the pin body 46 when the foldable boom 14 is in the folded position, such as by the physical configuration and/or material properties of the various cooperating components, i.e., the pivoting hinge 16, the microphone housing 18, and/or the foldable boom 14. For example, the pin body 46 and the corresponding front port 24 may be of sufficient size to adequately ensure that the headset 40 will remain in the folded position despite typical movements to which the headset 40 may be subjected. As another example, the boom 14 may comprise an elastomeric material so that it is somewhat flexible along its length yet still requires application of a small amount of force in order to pull the microphone housing 18 sufficiently away from the pin body 46 in order to release the microphone housing 18 from the pin body 46.

Figure 3A:
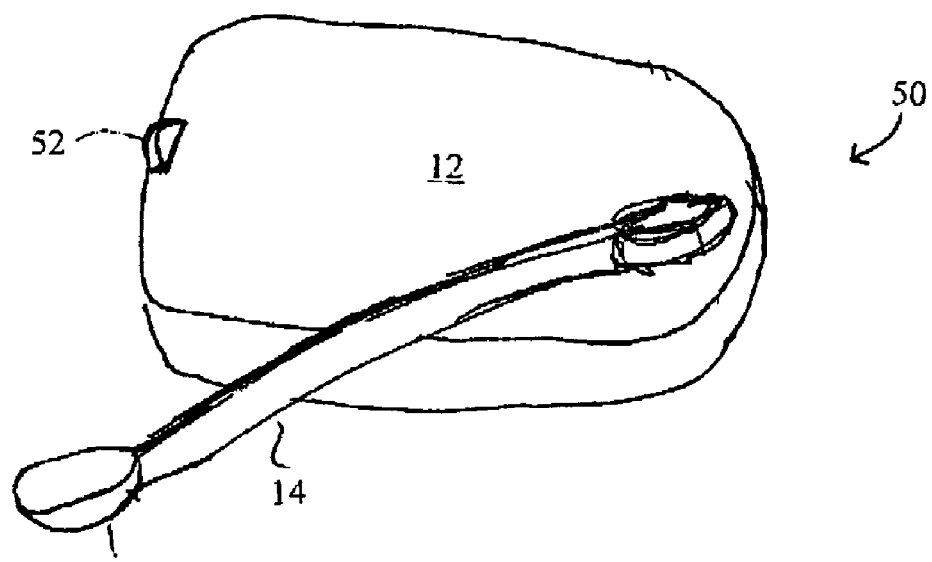
FIG. 3A is a perspective view of yet another exemplary foldable boom, dual-mode headset operable in both noise canceling and omnidirectional modes.
Figure 3B:
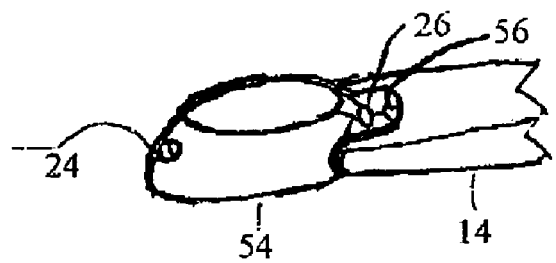
FIG. 3B is a perspective view of the foldable boom of the headset shown in FIG. 3A illustrating the microphone housing of the foldable boom in more detail.
Figure 3C:
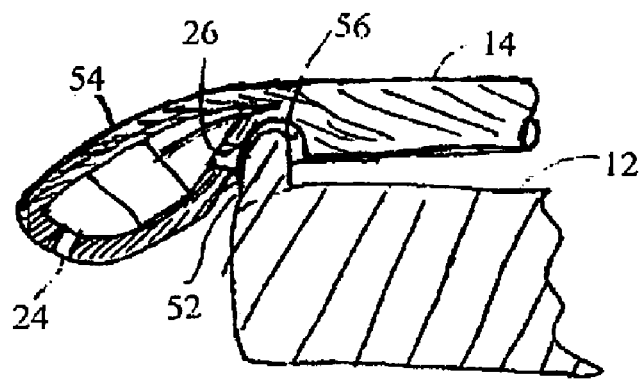
FIG. 3C is a partial cross-sectional view of the headset of FIG. 3A with the boom folded for operation in the omnidirectional mode.

FIG. 3A is a perspective view of yet another exemplary foldable boom, dual-mode headset 50 operable in both noise canceling and omnidirectional modes and shown in the noise canceling mode position. The headset 50 employs a lug 52 as its microphone securing mechanism for engaging the microphone housing 54, shown in more detail in the perspective view of FIG. 3B. In particular, FIG. 3B illustrates a side of the microphone housing 54 opposite that shown in FIG. 3A. In addition, FIG. 3C is a partial cross-sectional view of the headset 50 with the microphone housing 54 positioned over the lug 52 for operation in the omnidirectional mode.

As shown, the microphone housing 54 defines a cavity 56 configured to receive the lug 52. The rear port 26 terminates at the cavity 56 whereas the front port 24 is on an opposing side of the microphone housing 54. The lug 52 and/or the microphone housing 54 comprises an elastomeric material to facilitate positioning the foldable boom 14 in the folded and extended positions.

The microphone housing 54 may be passively maintained against the lug 52 when the foldable boom 14 is in the folded position, such as by the physical configuration and/or material properties of the various cooperating components, i.e., the pivoting hinge 16, the microphone housing 54, and/or the foldable boom 14. For example, the lug 52 and the corresponding cavity 56 may be of sufficient size to adequately ensure that the headset 40 will remain in the folded position despite typical movements to which the headset 50 may be subjected. As another example, the boom 14 may comprise an elastomeric material so that it is somewhat flexible along its length yet still requires application of a small amount of force in order to pull the microphone housing 18 sufficiently away from the lug 52 in order to release the microphone housing 54 from the lug 52.

Figure 4A:
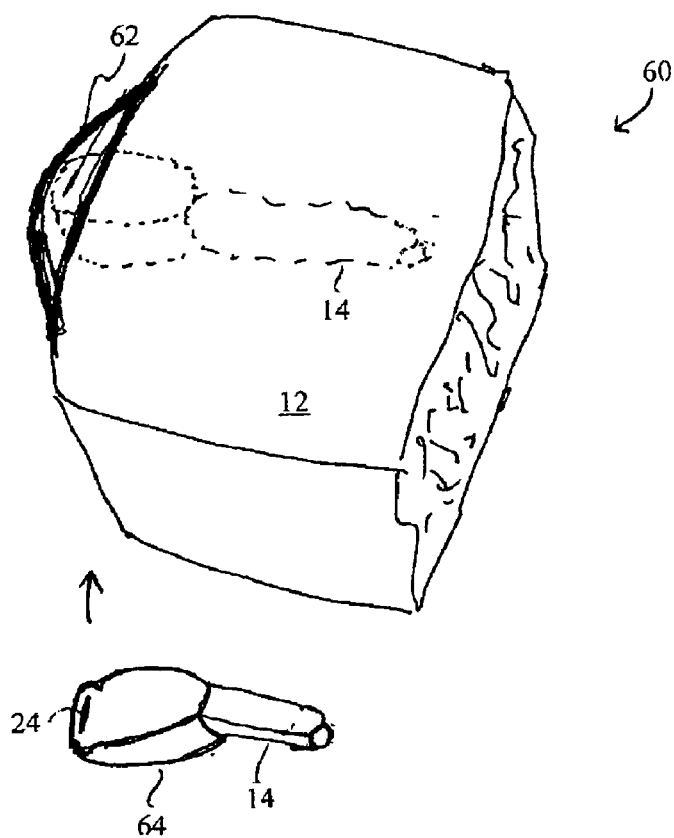
FIG. 4A is a partial perspective view of yet another exemplary foldable boom, dual-mode headset operable in both noise canceling and omnidirectional modes.

FIG. 4A is a partial perspective view of yet another exemplary foldable boom, dual-mode headset 60 operable in both noise canceling (the boom 14 shown in solid line) and omnidirectional modes (the boom 14 shown in dashed line). The headset 60 employs a wall extension 62 as its microphone securing mechanism for engaging the microphone housing 64, shown in more detail in the partial cross-sectional view of FIG. 4B. In addition, FIG. 4C is a partial cross-sectional view of the wall extension 62 engaging the microphone housing 64 when the headset 60 is in the omnidirectional position.

Figure 4B:
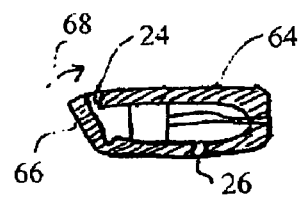
FIG. 4B is a partial cross-sectional view of a microphone housing of the foldable boom shown in FIG. 4A.

As shown, the wall extension 62 extends above the headset main body 12 for engaging the microphone housing 64. The microphone housing 64 includes a flexible member 66 that deflects in a direction shown by arrow 68 when engaged by the wall extension 62 to close the front port 24. The boom 14, microphone housing 64 including the flexible member 66, and the wall extension 62 are sized such that the wall extension 62 engages the flexible member 66 to close the front port 24 when the boom 14 is in the folded position. When the boom 14 is not in the folded position, the flexible member 66 is undeflected (as shown in FIG. 4B and in dashed lines in FIG. 4C) and the front port 24 is open. As is evident, the wall extension 62 is relatively rigid in order to exert a small amount of force to close the front port 24 whereas the flexible member 66 of the microphone housing 64 is relatively flexible in order to be deflected to close the front port 24. In addition, when the pressure on the flexible member 66 is removed, the flexible member 66 returns to its resting state, i.e., with the front port 24 open.

Figure 4C:
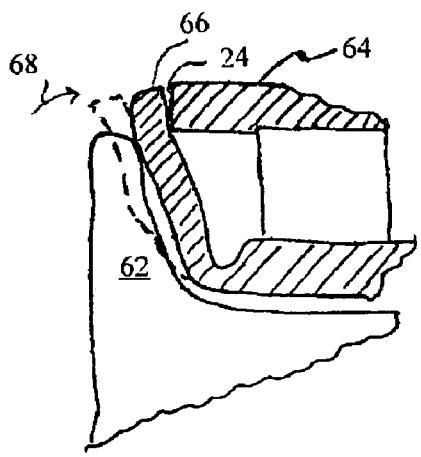
FIGS. 4C and 4D are partial cross-sectional views of two alternate configurations of the headset of FIG. 4A with the boom folded for operation in the omnidirectional mode.
Figure 4D:
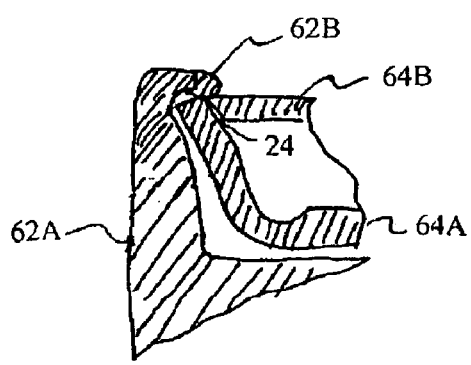

FIG. 4D is a partial cross-sectional view illustrating a variation on the wall extension embodiment of FIGS. 4A–4C. In particular, the wall extension 62A includes a relatively rigid projection 62B that engages a flexible member 64B of the microphone housing 64A. When engaged, the projection 62B pushes down on the flexible member 64B and closes the front port 24. When disengaged, the flexible member 64B returns to its resting or normal position such that the front port 24 is open.

Figure 5A:
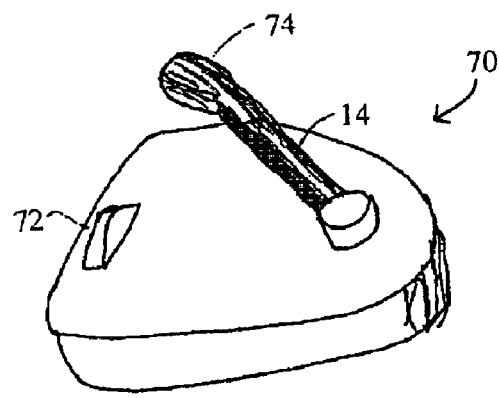
FIG. 5A is a perspective view of yet another exemplary foldable boom, dual-mode headset operable in both noise canceling and omnidirectional modes.
Figure 5B:
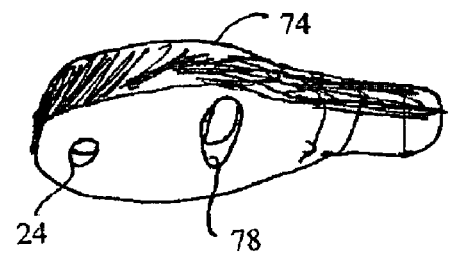
FIG. 5B is a perspective view of the foldable boom of the headset shown in FIG. 5A illustrating the microphone housing of the foldable boom in more detail.
Figure 5C:
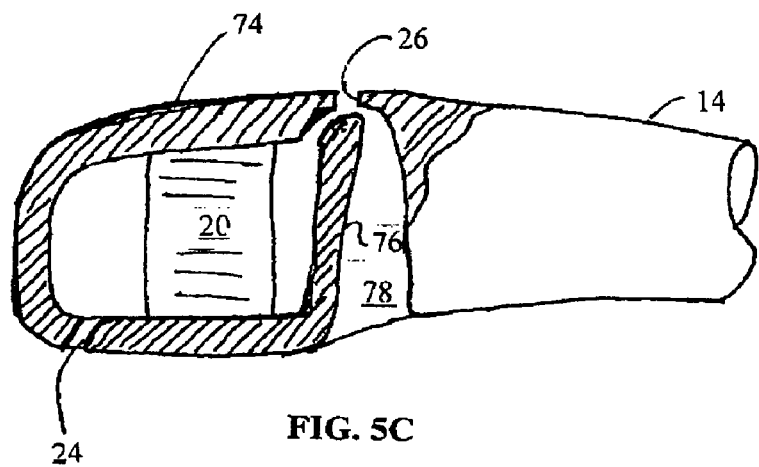
FIG. 5C is a partial cross-sectional view of the headset of FIG. 5A illustrating the microphone housing of the foldable boom in more detail.
Figure 5D:
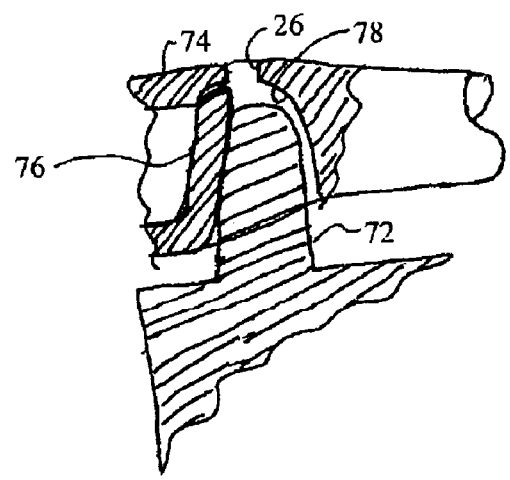
FIG. 5D is a partial cross-sectional view of the headset of FIG. 5A with the boom folded for operation in the omnidirectional mode.

FIG. 5A is a perspective view of yet another exemplary foldable boom, dual-mode headset 70 operable in both noise canceling and omnidirectional modes. The headset 70 employs a tab 72 as its microphone securing mechanism for engaging the microphone housing 74, shown in more detail in the partial cross-sectional view of FIG. 5B. More specifically, FIG. 5B is a perspective view illustrating a side of the microphone housing 74 opposite that shown in FIG. 5A. In addition, FIG. 5C is a partial cross-sectional view of the microphone housing 74 and FIG. 5D is a partial cross-sectional view of the tab 72 engaging the microphone housing 74 to close the rear port 26 when the headset 70 is in the omnidirectional position.

As shown, the tab 72 extends above the headset main body 12 for engaging the microphone housing 74. The microphone housing 74 includes a flexible member 76 that deflects in a direction toward the microphone 20 as shown in FIG. 5C when the microphone housing 74 is engaged by the tab 72 to close the rear port 26. In addition, the microphone housing 74 defines a cavity 78 for receiving the tab 72 therein. The boom 14, microphone housing 74 including the flexible member 76 and the cavity 78, and the tab 72 are sized such that the tab 72 engages the flexible member 76 once the tab 72 has entered the cavity 78 to close the rear port 26 when the boom 14 is in the folded position. When the boom 14 is not in the folded position, the flexible member 76 is undeflected and the rear port 26 is open, as shown in FIG. 5C. As is evident, the tab 72 is relatively rigid in order to exert a small amount of force to close the rear port 26 whereas the flexible member 76 of the microphone housing 74 is relatively flexible in order to be deflected to close the rear port 26. In addition, when the pressure on the flexible member 76 is removed, i.e., when the tab 72 is repositioned from within the cavity 78, the flexible member 76 generally returns to its resting state position, i.e., with the rear port 26 open.

Figure 6A:
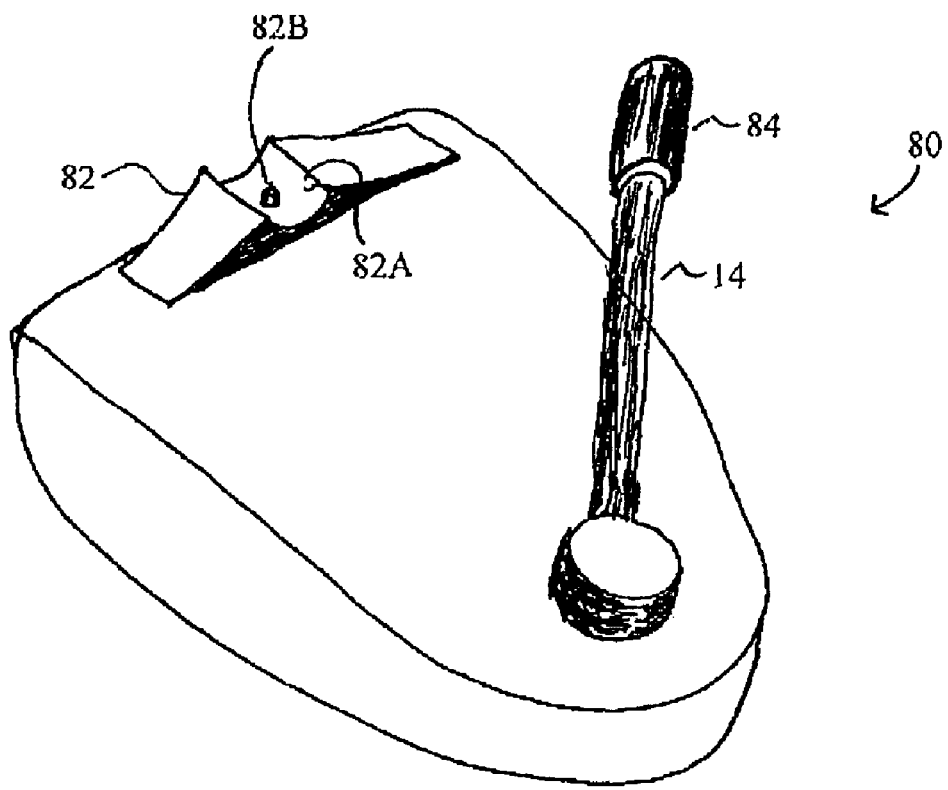
FIG. 6A is a perspective view of yet another exemplary foldable boom, dual-mode headset operable in both noise canceling and omnidirectional modes.
Figure 6B:
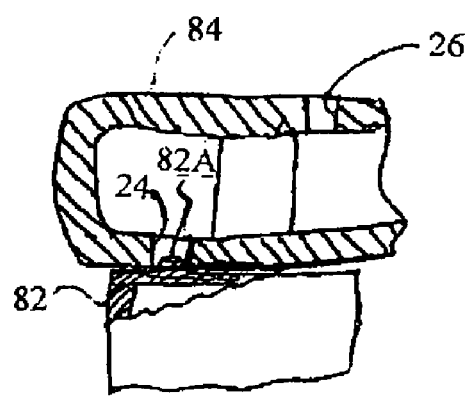
FIG. 6B is a partial cross-sectional view of the headset of FIG. 6A with the boom folded for operation in the omnidirectional mode.

FIG. 6A is a perspective view of yet another exemplary foldable boom, dual-mode headset 80 operable in both noise canceling and omnidirectional modes. As shown, the headset 80 employs a ramp 82 as its microphone securing mechanism for engaging the microphone housing 84. The ramp 82 defines a detent 82A which in turn provides a pin or other projection 82B extending therefrom. The detent 82A is configured to receive and hold the microphone housing 84, i.e., nest the microphone housing 84 therein. In addition, the pin projection 82B is configured to be received by the front port 24. The functionality of the ramp 82 is shown in more detail in FIG. 6B. In particular, FIG. 6B is a partial cross-sectional view of the microphone housing 84 engaged in the ramp 82 when the headset 80 is in the omnidirectional position. The ramp 82 preferably slopes up to either side of the detent 82A. The ramp 82 and/or the microphone housing 84 preferably comprises an elastomeric material.

Figure 7A:
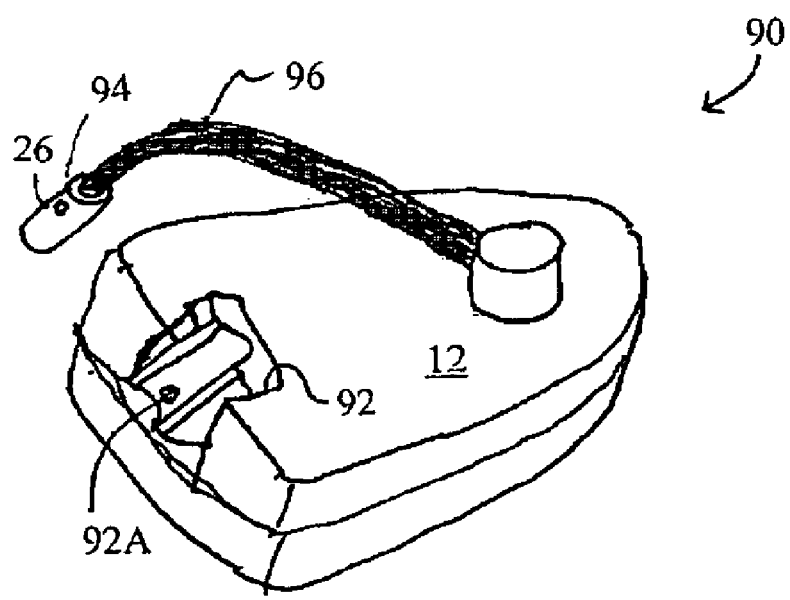
FIG. 7A is a perspective view of yet another exemplary foldable boom, dual-mode headset operable in both noise canceling and omnidirectional modes.
Figure 7B:
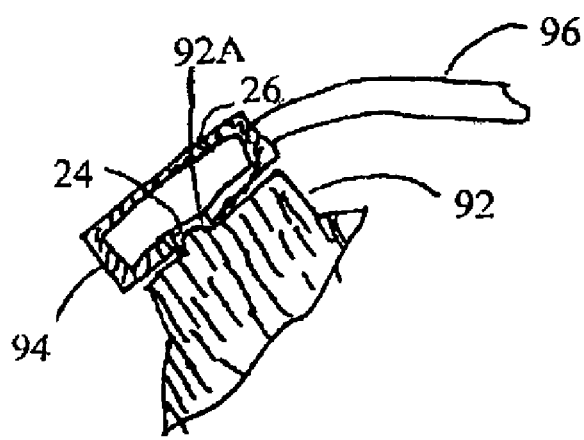
FIG. 7B is a partial cross-sectional view of the headset of FIG. 7A with the boom folded for operation in the omnidirectional mode.

FIG. 7A is a perspective view of yet another exemplary foldable boom, dual-mode headset 90 operable in both noise canceling and omnidirectional modes. The headset main body 12 defines a receiving cavity 92 as its microphone securing mechanism for engaging the microphone housing 94, shown in more detail in the partial cross-sectional view of FIG. 7B. More specifically, FIG. 7B is a partial cross-sectional view of the microphone housing 94 engaged within the receiving cavity 92 to close the front port 24 when the headset 90 is in the omnidirectional position.

As shown, the receiving cavity 92 is shaped to receive, engage, and hold the microphone housing 94 in the omnidirectional position. The receiving cavity 92 provides a pin or other protrusion 92A which is configured to engage and close the front port 24. In order for the microphone housing 94 at one end of the boom 96 to meet up with and be engaged by the receiving cavity 92 defined by the headset main body 12, the boom 96 is preferably curved. The boom 96 preferably comprises an elastomeric material so that the curvature of the boom 96 may be adjusted as the microphone housing 94 of the boom 96 is positioned into the receiving cavity 92 for the omnidirectional mode of operation and as the microphone housing 94 is removed from the receiving cavity 92 for the noise canceling mode of operation.

Figure 8A:
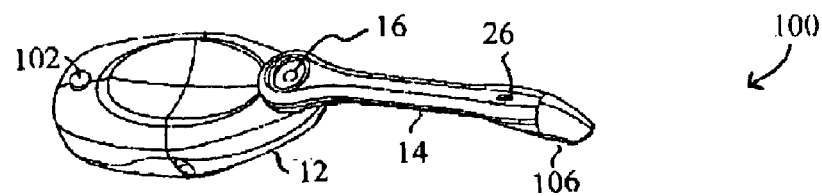
FIGS. 8A and 8B are a perspective and a side view, respectively, of yet another exemplary foldable boom, dual-mode headset operable in both noise canceling and omnidirectional modes and with the boom unfolded in the noise canceling mode.
Figure 8B:
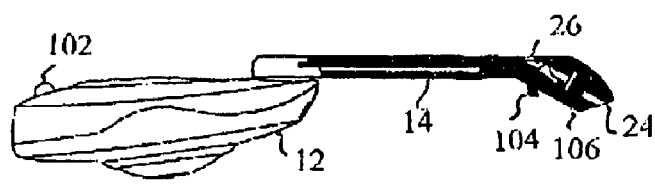
Figure 8C:
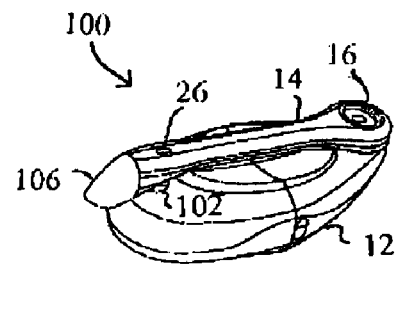
FIGS. 8C and 8D are a perspective and a side view, respectively, of the headset of FIGS. 8A and 8B with the boom folded for operation in the omnidirectional mode.
Figure 8D:
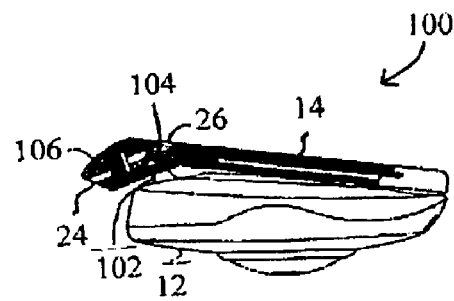

FIGS. 8A and 8B are a perspective and a side view, respectively, of yet another exemplary foldable boom, dual-mode headset 100 operable in both noise canceling and omnidirectional modes and with the boom 14 unfolded in the noise canceling mode. FIGS. 8C and 8D are a perspective and a side view, respectively, of the headset 100 with the boom 14 folded for operation in the omnidirectional mode.

As shown in FIGS. 8A and 8B, when the foldable boom 14 of the headset 100 is in the noise canceling mode, both the front and rear ports 24, 26 are open. When the boom 14 is rotated about pivot 16 to the folded position for operation in the omnidirectional mode as shown in FIGS. 8C and 8D, a projection 102 defined on the headset main body 12 engages a flexible member 104 of microphone housing 106. The projection 102 is shaped and positioned to facilitate engagement of the flexible member 104 such that the flexible member 104 flexes or moves and is pushed into and/or toward the remainder of the microphone housing 106 to close the rear port 26 while leaving the front port 24 open. The flexible member 104 is preferably made of an elastomeric material and preferably extends from and is integral with the microphone housing 106.

FIGS. 9A and 9B are a perspective and a side view, respectively, of yet another exemplary foldable boom, dual-mode headset 110 operable in both noise canceling and omnidirectional modes and with the boom 14 unfolded in the noise canceling mode. FIGS. 9C and 9D are a perspective and a side view, respectively, of the headset 110 with the boom 14 folded for operation in the omnidirectional mode.

As shown in FIGS. 9A and 9B, when the foldable boom 14 of the headset 110 is in the noise canceling mode, both the front and rear ports 24, 26 are open. When the boom 14 is rotated about pivot 16 to the folded position for operation in the omnidirectional mode as shown in FIGS. 9C and 9D, a projection 112 defined on the headset main body 12 engages a movable member 114 of microphone housing 116. The projection 112 is shaped and positioned to facilitate engagement of the movable member 114 such that the movable member 114 is pushed into and/or toward the remainder of the microphone housing 116 to close the rear port 26 while leaving the front port 24 open. The movable member 114 may be attached to and integral with the microphone housing 116 such as via a flexible membrane or flange.

The various embodiments described above with reference to FIGS. 1–9 are merely examples and numerous other variations may also be employed. Thus, while the preferred embodiments of the present invention are described and illustrated herein, it will be appreciated that they are merely illustrative and that modifications can be made to these embodiments without departing from the spirit and scope of the invention. Accordingly, the invention is intended to be defined only in terms of the following claims.

What is claimed is:

1. A communication apparatus for receiving acoustic signals from a desired acoustic source and generating transmit signals, comprising:
a main body;
a foldable boom extending between a pivoting end and a microphone housing for housing a microphone, the microphone having at least two ports; and
a pivoting hinge coupling the pivoting end of the boom to the main body and enabling the boom to rotate about the pivoting hinge relative to the main body,
wherein the boom is adapted to be positioned in at least a first position and a second folded position, the first position of the boom being such that the microphone is located away from the main body and said at least two ports are open for receiving acoustic signal therein and the second position being such that the microphone housing is at least partially in contact with the main body at a contact location on the main body such that one of said at least two ports is generally closed thereby and one of the two ports is open to receiving acoustic signals and another of the two ports is generally closed from receiving acoustic signals when the boom is in the second folded position.

2. The apparatus of claim 1, wherein said contact location generally closes said port when the boom is in the second position by preventing said closed port from receiving most acoustic signals.

3. The apparatus of claim 1, wherein said apparatus is operable in a noise canceling mode of operation in said first position and in an omnidirectional mode of operation in said second position.

4. The apparatus of claim 1, wherein at least one of said microphone housing and said contact location comprises an elastomeric material.

5. The apparatus of claim 1, wherein said at least two ports comprises a front port and a rear port wherein said rear port is further away from the desired acoustic source than the front port when said boom is in the first position.

6. The apparatus of claim 5, wherein said microphone includes a microphone diaphragm and said front and rear ports are disposed on opposing sides of said microphone diaphragm.

7. The apparatus of claim 1, wherein said main body comprises a clip configured to receive the microphone housing when the boom is in the second position, said clip including a projection extending therefrom, said projection being said contact location adapted to generally close one of said ports.

8. The apparatus of claim 1, wherein said main body comprises a pin extending therefrom configured for at least partial insertion into and generally closing of one of said ports when the boom is in the second position, said pin being said contact location.

9. The apparatus of claim 1, wherein said main body comprises a lug and said microphone housing defines a cavity into which one of the ports terminates, said lug being configured to be at least partially positioned in said cavity for generally closing of said port that terminates in said cavity when the boom is in the second position.

10. The apparatus of claim 1, wherein said main body comprises a wall extension, said wall extension being said contact location, and wherein said microphone housing includes a flexible member forming a boundary for one of the ports, said wall extension being configured to push against said flexible member to cause said flexible member to generally close said port for which the flexible member is a boundary when the boom is in the second position.

11. The apparatus of claim 1, wherein said main body comprises a tab, said tab being said contact location, and wherein said microphone housing defines a cavity and includes a flexible member forming a boundary for one of the ports and for the cavity, said tab being configured to be at least partially inserted into said cavity to push against said flexible member thereby causing said flexible member to generally close said port for which the flexible member is a boundary when the boom is in the second position.

12. The apparatus of claim 1, wherein said main body comprises a ramp, said ramp being said contact location, said ramp defining a detent configured to receive said microphone housing therein, said detent having a projection extending therefrom and configured for at least partial insertion into and generally closing of one of said ports when the boom is in the second position.

13. The apparatus of claim 1, wherein said main body defines a receiving cavity, said receiving cavity being said contact location, said receiving cavity being configured to receive said microphone housing therein and comprises a projection configured for at least partial insertion into and generally closing of one of said ports when the boom is in the second position.

14. The apparatus of claim 13, wherein said boom is curved to facilitate seating of the microphone housing in said receiving cavity when the boom is in the second position.

15. The apparatus of claim 1, wherein said microphone housing provides a movable member and wherein said main body comprises a projection extending therefrom configured to engage said movable member when the boom is in the second position, said projection being said contact location adapted to generally close one of said ports by generally moving said movable member toward a remainder of said microphone housing to close the one of the at least two ports.

16. A dual-mode headset operable in an omnidirectional mode and a noise canceling mode, comprising:
a main body;
a foldable boom coupled to the main body at a pivot, the foldable boom having a first extended position for operation of the headset in the noise canceling mode and a second folded position for storage and operation of the headset in the omnidirectional mode; and
a microphone housing disposed at an end of the foldable boom opposite the pivot for housing a microphone, the microphone housing defining two sound ports, wherein both ports are open to receiving acoustic signals when the foldable boom is in the first extended position and one of the two ports is open to receiving acoustic signals and another of the two ports is generally closed from receiving acoustic signals when the foldable boom is in the second folded position.

17. The dual-mode headset of claim 16, wherein the microphone housing is in contact with the main body at a contact location on the main body when the foldable boom is in the second folded position such that one of the two ports is generally closed from receiving most acoustic signals.

18. The dual-mode headset of claim 16, wherein at least one of the microphone housing and the main body comprises an elastomeric material.

19. The dual-mode headset of claim 16, wherein the two ports comprises a front port and a rear port wherein the rear port is further away from a desired acoustic source than the front port when the foldable boom is in the first extended position.

20. The dual-mode headset of claim 19, wherein the microphone includes a microphone diaphragm and the front and rear ports are disposed on opposing sides of the microphone diaphragm.

21. The dual-mode headset of claim 16, wherein the main body comprises a clip configured to receive the microphone housing when the boom is in the second position, the clip including a projection extending therefrom and adapted to generally close one of the ports.

22. The dual-mode headset of claim 16, wherein the main body comprises a pin extending therefrom configured for at least partial insertion into and generally closing of one of the ports when the boom is in the second position.

23. The dual-mode headset of claim 16, wherein the main body comprises a lug and the microphone housing defines a cavity into which one of the ports terminates, the lug being configured to be at least partially positioned in the cavity for closing of the port that terminates in the cavity when the boom is in the second position.

24. The dual-mode headset of claim 16, wherein the main body comprises a wall extension and the microphone housing includes a flexible member forming a boundary for one of the ports, the wall extension being configured to push against the flexible member to cause the flexible member to close the port for which the flexible member is a boundary when the boom is in the second position.

25. The dual-mode headset of claim 16, wherein the main body comprises a tab and the microphone housing defines a cavity and includes a flexible member forming a boundary for one of the ports and for the cavity, the tab being configured to be at least partially inserted into the cavity to push against the flexible member thereby causing the flexible member to close the port for which the flexible member is a boundary when the boom is in the second position.

26. The dual-mode headset of claim 16, wherein the main body comprises a ramp defining a detent configured to receive the microphone housing therein, the detent having a projection extending therefrom and configured for at least partial insertion into and closing of one of the ports when the boom is in the second position.

27. The dual-mode headset of claim 16, wherein the main body defines a receiving cavity configured to receive the microphone housing therein and comprises a projection configured for at least partial insertion into and closing of one of the ports when the boom is in the second position.

28. The dual-mode headset of claim 27, wherein the boom is curved to facilitate seating of the microphone housing in the receiving cavity when the boom is in the second position.

29. The dual-mode headset of claim 16, wherein said microphone housing provides a movable member and wherein said main body comprises a projection extending therefrom configured to engage said movable member when the foldable boom is in the second folded position, said projection being adapted to generally close said another of the two sound ports by generally moving said movable member toward a remainder of said microphone housing to close said another of the two sound ports.

* * * * *